Oct. 22, 1957     C. A. RETTMAN     2,810,614
BEARING FOR ROTARY DRIVEN VERTICAL PUMP SHAFT
Filed Dec. 21, 1956
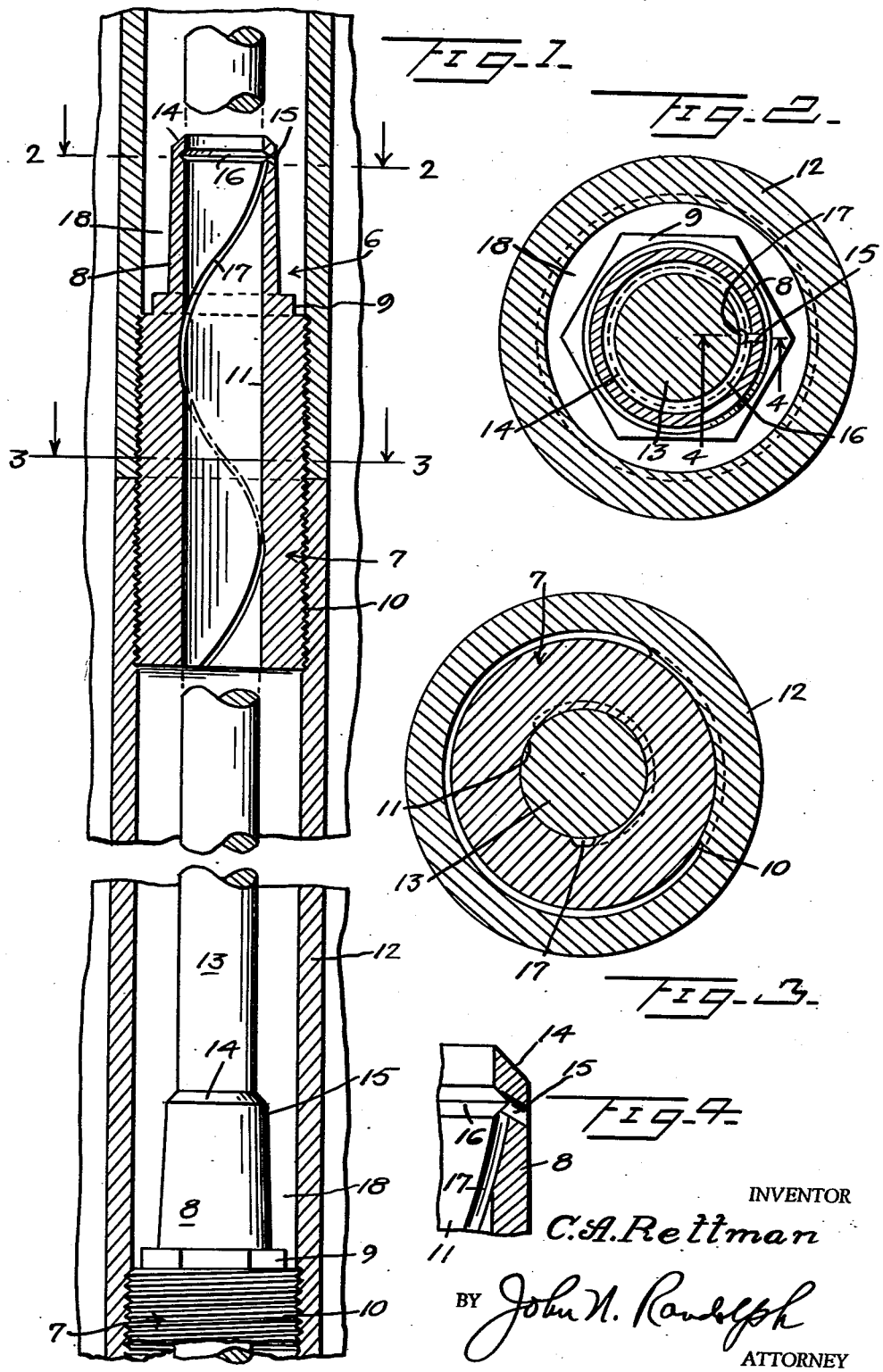
INVENTOR
C. A. Rettman
BY John N. Randolph
ATTORNEY

United States Patent Office 2,810,614
Patented Oct. 22, 1957

2,810,614

BEARING FOR ROTARY DRIVEN VERTICAL PUMP SHAFT

Carl A. Rettman, Hereford, Tex.

Application December 21, 1956, Serial No. 629,959

7 Claims. (Cl. 308—134.1)

This invention relates to an improved bearing for use with vertical rotary driven pump shafts which are journaled in a plurality of spaced bearings and which bearings are lubricated by passing a lubricating oil by gravity from each bearing to the bearing disposed therebeneath.

The most common method of lubricating the bearings of vertical pump shafts, such as vertical turbine pumps, the shaft of which is journaled in a plurality of bearings which, together with the shaft, are contained in a tubing, is by dripping a lubricating oil into the upper portion of the tubing and permitting the oil to pass by gravity through the successive bearings and to escape from beneath the lowermost bearing. Such rotary pump shafts are usually journaled in from thirty to fifty bearings. Due to wear and condensation, abrasive particles worn from the bearings and shafts and rust particles are picked up and carried downwardly by the lubricating oil through the succession of bearings. This results in unnecessary wear on the shaft and bearings making necessary frequent repairs which require removal of the pump from the well casing, which involves a very time consuming and costly operation.

Accordingly, it is a primary object of the present invention to provide an improved bearing for rotary driven vertical pump shafts which will eliminate this wear and damage to the shaft and bearing by separating abrasive particles and other impurities from the lubricating oil before it passes through a bearing, to thus maintain the oil substantially purified at all times.

Various other objects and advantages of the invention will hereinafter become more fully apparent from the following description of the drawing, illustrating a presently preferred embodiment thereof and wherein:

Figure 1 is a fragmentary vertical sectional view partly in elevation illustrating a portion of a rotary driven pump shaft journaled in the improved bearing;

Figures 2 and 3 are cross sectional views through the bearing, taken substantially along planes as indicated by the lines 2—2 and 3—3, respectively, of Figure 1, and on enlarged scales, and Figure 4 is an enlarged fragmentary vertical sectional view of a portion of the bearing, taken substantially along a plane as indicated by the line 4—4 of Figure 2.

Referring more particularly to the drawing, the bearing in its entirety is designated generally 6 and includes a cylindrical body portion 7 constituting the lower part thereof, and neck 8, constituting the upper part of the bearing 6, which is of a lesser external diameter than the cylindrical portion 7. The neck 8, at the lower end thereof which merges integrally with the upper end of the body portion 7, is externally enlarged and provided with wrench lands to form a wrench engaging portion 9 which is somewhat smaller than the body portion 7. The body portion 7 is externally threaded as seen at 10 from end-to-end thereof. The bearing 6 has a circular bore 11 extending longitudinally therethrough.

The externally threaded portion 10 is provided so that the body portion 7 of the bearing will function as a coupling, and as illustrated in Figure 1, the portion 10 threadedly engages adjacent ends of two sections of a tubing 12 through which the rotary driven pump shaft 13 extends and which shaft enclosing tubing 12 is mounted in an eduction pipe, not shown, of the pump. The sections forming the tubing 12 are usually six or seven feet in length and a bearing 6 forms a coupling for each joint of the tubing 12. Accordingly, since the tubing 12 for most pumping operations is in excess of two hundred feet in length, normally thirty or more bearings 6 are provided in which the rotary drive shaft 13 is journaled. One such bearing 6 is shown in Figure 1 in vertical section and the upper portion of another such bearing is shown in elevation disposed therebeneath.

The upper end of the neck 8 of each bearing 6 is beveled as seen at 14 to provide a downwardly and outwardly inclined annular shoulder. The neck 8 beneath and adjacent its beveled upper end 14 is provided with a port 15, as best seen at Figure 4, the inner end of which opens into a portion of an annular groove 16. Said groove 16 is formed internally of the upper portion of the neck 8 and opens into the bore 11, near the upper end of said bore. The port 15 is inclined downwardly and outwardly from the groove 16 and opens outwardly of a portion of the periphery of the neck 8. A spiral groove 17 is formed in the interior of the bearing 6 and opens into the bore 11, from end-to-end of said groove. The upper end of the groove communicates with the inner end of the port 15 and with a portion of the annular groove 16, and the lower end of the groove 17 opens outwardly of the lower end of the bearing 6. The groove 17 constitutes more than a complete convolution, as seen in Figure 1. The neck 8 of each bearing 6 cooperates with the upper end of the body portion 7 and a part of the tubing 12 which surrounds said neck 8 to form an annular chamber 18.

The shaft 13, as is conventional, is lubricated with oil which is dripped into the upper end of the tubing 12 and which passes downwardly by gravity through the bores of the bearings in which the shaft is journaled. However, with conventional bearings as now utilized with rotary driven pump shafts, the oil enters the upper end of each bearing bore which opens through a substantially flat upper end of the bearing. Consequently, all abrasive particles and rust particles picked up by the lubricating oil will pass downwardly therewith through each bearing disposed below the point where the abrasive particle was picked up by the oil. This results in considerable wear on the shaft 13 and bearings and greatly lessens the life of the shaft and bearings and the length of time that the pump can operate without repairs. These objectional features are overcome by the improved bearing 6. As will be readily apparent, as the oil escapes from the lower end of each groove 17 it will flow downwardly by gravity along a part of the shaft 13 until it contacts the inclined annular shoulder 14 of the next lower bearing 6. The oil will be deflected outwardly and downwardly by the shoulder 14 into the chamber 18 of said bearing 6. Any rust or other abrasive particles will settle to the bottom of the chamber 18 and the purified oil filling the upper part of the chamber 18, to the level of the upper end of the groove 17 and the lower part of the groove 16, will pass inwardly through the port 15 to partially fill the groove 16 and so that a part thereof will flow downwardly through the groove 17. The part of the shaft 13 journaled in the upper end of the bore 11 will be lubricated by the oil in the groove 16 and the part of the shaft disposed in the bore 11, below the groove 16, will be lubricated by the oil in the groove 17, which is flowing downwardly therethrough and escaping from the lower end of said groove to pass downwardly along the shaft 13 to the next bearing 6, where the operation previously described is repeated. It will be understood that as the tubing 12 is assembled sufficient lubricating oil will be poured into each tube section to substantially fill the chamber 18 located adjacent the lower end of said section so that the chambers 18 will always be filled with oil to adjacent the level of the upper end of the groove 17.

Various modifications and changes are contemplated and may be resorted to, without departing from the function or scope of the invention as hereinafter defined by the appended claims.

I claim as my invention:

1. The combination with a rotary driven vertical pump shaft and a tubing loosely surrounding and enclosing said shaft, of a bearing having a bore extending longitudinally therethrough in which a portion of the shaft is journaled, said bearing including a lower portion having a tight fitting engagement in a part of the tubing and forming a liquid seal between the tubing and bearing, said bearing having an externally restricted upper portion forming a neck, said neck being of an external diameter less than the external diameter of the lower portion of the bearing to combine with a part of the tubing disposed around said neck to form an annular upwardly opening chamber adapted to contain a lubricating oil, said neck having a port adjacent the upper end thereof opening into the upper portion of the bearing bore and outwardly into said chamber for supplying the lubricating oil from said chamber to the bore, said neck having an annular downwardly and outwardly sloping end.

2. The combination with a rotary driven vertical pump shaft and a tubing loosely surrounding and enclosing said shaft, of a bearing having a bore extending longitudinally therethrough in which a portion of the shaft is journaled, said bearing including a lower portion having a tight fitting engagement in a part of the tubing and forming a liquid seal between the tubing and bearing, said bearing having an externally restricted upper portion forming a neck, said neck being of an external diameter less than the external diameter of the lower portion of the bearing to combine with a part of the tubing disposed around said neck to form an annular upwardly opening chamber adapted to contain a lubricating oil, said neck having a port adjacent the upper end thereof opening into the upper portion of the bearing bore and outwardly into said chamber for supplying the lubricating oil from said chamber to the bore, said port being inclined outwardly and downwardly to prevent rust and other abrasive particles from passing inwardly through said port with the oil.

3. The combination with a rotary driven vertical pump shaft and a tubing loosely surrounding and enclosing said shaft, of a bearing having a bore extending longitudinally therethrough in which a portion of the shaft is journaled, said bearing including a lower portion having a tight fitting engagement in a part of the tubing and forming a liquid seal between the tubing and bearing, said bearing having an externally restricted upper portion forming a neck, said neck being of an external diameter less than the external diameter of the lower portion of the bearing to combine with a part of the tubing disposed around said neck to form an annular upwardly opening chamber adapted to contain a lubricating oil, said neck having a port adjacent the upper end thereof opening into the upper portion of the bearing bore and outwardly into said chamber for supplying the lubricating oil from said chamber to the bore, said neck having an annular internal groove near the upper end thereof communicating with a portion of said bore, the inner end of said port opening into said groove.

4. A bearing as in claim 3, said bearing having an internal groove of spiral configuration opening into the bore from end-to-end of said groove and having an upper end communicating with said annular groove and the inner end of said port and a lower end opening through the lower end of the bearing.

5. A bearing as in claim 4, said neck having an annular downwardly and outwardly sloping upper end, and said port sloping downwardly and outwardly from the inner to the outer end thereof.

6. A bearing as in claim 5, said neck including a wrench land portion located at the lower end thereof of a lesser diameter than the external diameter of the lower portion of the bearing.

7. The combination with a rotary driven vertical pump shaft and a tubing loosely surrounding and enclosing said shaft, of a bearing having a bore extending longitudinally therethrough in which a portion of the shaft is journaled, said bearing including a lower portion having a tight fitting engagement in a part of the tubing and forming a liquid seal between the tubing and bearing, said bearing having and externally restricted upper portion forming a neck, said neck being of an external diameter less than the external diameter of the lower portion of the bearing to combine with a part of the tubing disposed around said neck to form an annular upwardly opening chamber adapted to contain a lubricating oil, said neck having a port adjacent the upper end thereof opening into the upper portion of the bearing bore and outwardly into said chamber for supplying the lubricating oil from said chamber to the bore, said bearing being provided with an internally disposed spiral groove opening into the bearing bore from end-to-end of said groove, said spiral groove having an upper end communicating with the inner end of the port and a lower end opening through the lower end of said bearing.

References Cited in the file of this patent

UNITED STATES PATENTS

| 1,975,612 | Nystrom | Oct. 2, 1934 |
| 2,219,519 | Fabrin | Oct. 29, 1940 |